Patented Oct. 20, 1953

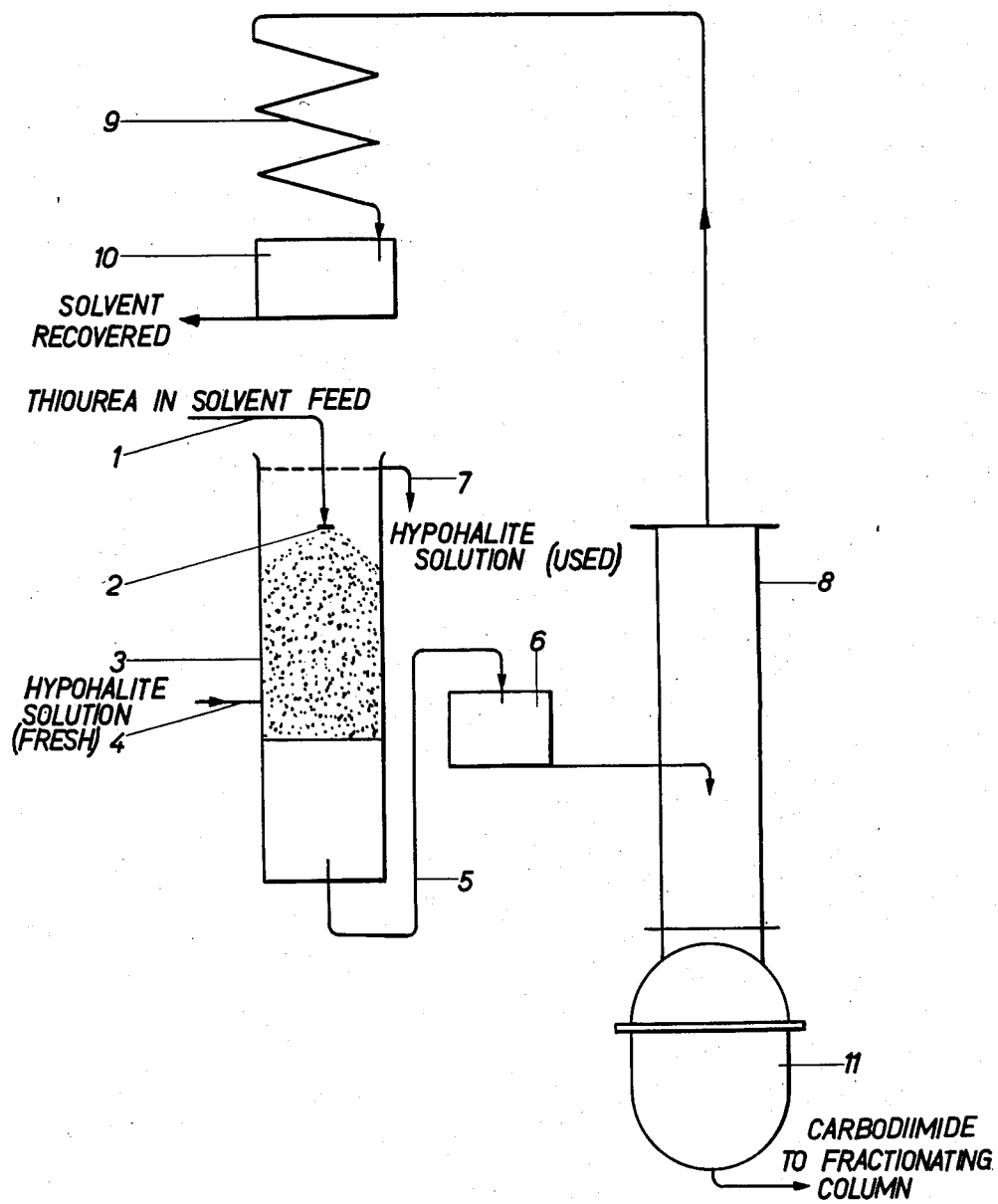

2,656,383

UNITED STATES PATENT OFFICE 2,656,383

PREPARATION OF CARBODIIMIDES

Erich Schmidt, Bad Reichenhall, and Robert Schnegg, Dormagen, Germany, assignors to Farbenfabriken Bayer, Leverkusen, Germany Application January 3, 1951, Serial No. 204,185
In Germany January 4, 1950

7 Claims. (Cl. 260—551)

The present invention relates to the production of carbodiimides and more particularly to a process of producing carbodiimides from substituted thioureas.

It is known in the art to produce carbodiimides of the general formula RN=C=NR' wherein R and R' may be hydrogen or an aliphatic, aromatic, hydroaromatic or heterocyclic radical, by reacting bases of heavy metals, for instance, mercury oxide or lead oxide, upon the analogous thioureas, carbodiimides being formed while the hydrogen sulfide split off yields sulfides of the heavy metals.

The aforesaid process which is complicated and slow has found no commercial application. So far the carbodiimides have remained a class of compounds which has not been thoroughly investigated, although their great reactivity due to the two double-linkages renders them suitable as starting materials for a great number of valuable compounds.

It is therefore an object of this invention to provide an improved and simplified process for the production of carbodiimides.

A further object consists in a process which can be carried out with greatly increased yields.

Another object consists in the provision of a cointinuous process for the production of carbodiimides.

These objects are accomplished by the present invention according to which it has been found that carbodiimides may be obtained from the corresponding thioureas in great purity and with almost the theoretical yield by treating the substituted thioureas with aqueous alkaline hypohalite solutions. The hydrogen sulfide split off by the reaction from the substituted thioureas is oxidized to sulfur or sulfuric acid. The reaction is instantaneous even at low temperatures; the substituted carbodiimides formed are separated from the aqueous hypohalite solution without difficulty.

For carrying our process into effect the substituted thiourea may be shaken, for instance, with an alkaline hypochlorite solution. This is preferably done in the production of carbodiimides that are liquid at normal temperature, since in such case the carbodiimide formed floats on the hypochlorite solution as an oily layer and can be easily separated.

The substituted thiourea may also be dissolved in organic solvent, the carbodiimide formed passing into the solvent layer from which it can be separated by distillation. Suitable solvents are all sparingly water-soluble organic solvents capable of dissolving the carbodiimide formed. It is often of advantage to employ a solvent that simultaneously dissolves the thiourea employed in the reaction. In these cases the thiourea may be produced in the solvent and need not be recovered before its conversion into carbodiimide.

Another advantage of the present invention consists in the possibility of carrying out the process continuously which is of great commercial importance.

The continuous process is carried out, for instance, in an apparatus shown in the accompanying drawing. The single figure is a diagrammatic flow plan showing a possible embodiment of our continuous process.

In the figure, the solution of thiourea in an organic solvent, which is heavier than water, is supplied through pipe 1 and spray 2 into a vertical tube 3 in counter-current to the hypohalite solution entering at 4. After passing through the hypohalite layer, the thiourea has been converted into carbodiimide and is collected in a dissolved state at the lower end of the tube in the organic solvent and is continuously discharged through tube 5 into an intermediate vessel 6. The hypohalite solution leaves the reaction tube at 7. The solution of carbodiimide is led to a fractionating column 8. The solvent is distilled off, recovered in condenser 9 and collected in vessel 10, then returned to the cycle. The carbodiimide is collected in the sump 11 of the column and may be passed into a vacuum fractionating column for further purification.

The apparatus shown in the accompanying drawing is merely a convenient embodiment for carrying out the invention and is capable of many variations depending on the kind of the organic solvent employed as well as of the carbodiimide to be produced.

The present invention is further illustrated by the following examples without being restricted thereto:

*Example 1*

20 grams of finely powdered diisopropyl-thiourea (obtained according to Berichte, vol. 74, 1289 (1949)) are shaken in a 1 liter-stoppered bottle with 675 cc. of an ice-cooled sodium hypochlorite solution (obtained according to "Berichte der dt. chem. Ges." 35, 2753 (1902)) corresponding to 2.4 mols of hypochlorite per one mol of thiourea. The temperature of the solution rising during reaction is kept at 5–10° C. by cooling. After 45 minutes the thiourea has decomposed and the diisopropylcarbodiimide formed floats on the aqueous solution as an oily liquid. It is separated or, if necessary, taken up with ether and dried over calcium chloride. After evaporating the ether the diisopropl-carbodiimide is distilled in vacuo as a uniformly boiling liquid of the boiling point 36–37° C. under 10 mm. pressure. The yield amounts to 12.5 grams of colorless diisopropyl-carbodiimide corresponding to 79.2% of the theoretical.

*Example 2*

A dispersion of 40 grams of dicyclohexyl-thiourea (cf. A. Skita and H. Rölfes, "Ber. dt. chem. Ges." 53, 1247 (1920),) in 200 cc. of methylene chloride is added to an alkaline hypobromite solution at −10° C. The alkaline hypobromite solution was prepared from 84.3 grams of sodium hydroxide (95%), 900 cc. of water, 34 cc. of bromine (=106.6 grams) at −10° C. (cf. C. Graebe, vol. 35, 2753 (1902)).

After shaking the reaction mixture for 1½ hours the methylene chloride is separated, washed with water several times and dried with calcium chloride. After distilling off the filtered solvent, dicyclohexyl-carbodiimide distills under 10 mm. pressure; the first 2 cc. of the distillate are separated off as first runnings. The yield amounts to 30 grams corresponding to 87.5% of the theoretical.

Upon redistillation the dicyclohexyl-carbodiimide boils at 150–156° C. under 11 mm. pressure (temperature of the oil-bath about 185° C., cf. E. Schmidt, F. Hitzler, and E. Lahde, "Ber. dt. chem. Ges," 71, 1938 (1938)).

*Example 3*

73.12 grams (½ mol) of methyl-tertiary-butyl-thiourea in methylene chloride (prepared according to Liebig's Annalen, 560, 225 (1948)) are added at −9° C. to 2150 cc. of sodium hypochlorite solution corresponding to 2.1 mols. The hypochlorite solution was prepared as described in Example 1 and was previously cooled to −9° C. when intimately mixing the solution by stirring, the reaction is complete within about 20 minutes with the conversion of the thiourea into carbodiimide. Titration of the hypochlorite solution shows that about 3.2 mols of hypochlorite per 1 mol of thiourea have been consumed.

The methylene-chloride layer containing the carbodiimide formed is discharged, washed with water and dried with calcium chloride. After distilling off the methylene chloride the methyl-tertiary-butyl-carbodiimide formed distills over at 64–65° C. under 90 mm. pressure as a pleasantly smelling water-clear liquid.

The yield amounts to 51.15 grams of methyl-tertiary-butyl-carbodiimide corresponding to 91.2% of the theoretical.

We claim:

1. A process of producing carbodiimides, which process comprises contacting an excess of an aqueous solution of an alkali metal hypohalite with a thiourea having the general formula

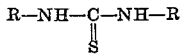

wherein R stands for a radical selected from the group consisting of lower branched chain alkyl and cycloalkyl radicals.

2. A process of producing carbodiimides, which process comprises contacting at a temperature not exceeding 35° C. an excess of an aqueous solution of an alkali metal hypohalite with a thiourea having the general formula

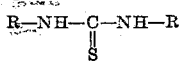

wherein R stands for a radical selected from the group consisting of lower branched chain alkyl and cycloalkyl radicals.

3. A process of producing carbodiimides, which process comprises contacting at a temperature not exceeding 35° C. an excess of an aqueous solution of an alkali metal hypohalite with a thiourea having the general formula

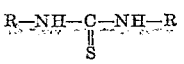

wherein R stands for a radical selected from the group consisting of lower branched chain alkyl and cycloalkyl radicals, and separating the carbodiimide formed from said aqueous solution.

4. The process which comprises mixing a lower branched chain N,N'dialkyl-thiourea with an excess of ice-cooled aqueous alkaline sodium hypochlorite solution, keeping the temperature of the mixture below 10° C. separating the oily liquid formed from said aqueous solution and recovering the pure N,N'dialkylcarbodiimide by distillation.

5. The process which comprises mixing a dispersion of N,N'dicyclohexyl-thiourea in a low boiling organic solvent with an excess of an aqueous alkaline solution of sodium hypobromite, evaporating the solvent and recovering pure N,N'-dicyclohexyl-carbodiimide by distillation.

6. A process as claimed in claim 4 in which the lower dialkyl-thiourea is N,N'di-isopropyl-thiourea.

7. A process as claimed in claim 4 in which the lower dialkyl-thiourea is N,N'methyl-tertiary-butyl-thiourea.

ERICH SCHMIDT.
ROBERT SCHNEGG.

References Cited in the file of this patent

Mulder et al., "Ber. deut. chem.," vol. 7, 1874, p. 1637.

Claus, "Liebigs Annalen," vol. 179 (1875), pp. 140 to 145.

McGowan, "J. Chem. Soc." (London), vol. 49 (1886), p. 191.

McGowan, "J. Chem. Soc." (London), vol. 51 (1887), pp. 378–379.